(12) United States Patent
Kim et al.

(10) Patent No.: US 8,064,911 B2
(45) Date of Patent: Nov. 22, 2011

(54) METHOD OF VERTICAL HANDOFF

(75) Inventors: Won-Ik Kim, Seoul (KR); Bong-Ju Lee, Jeonju (KR); Seung-Kwon Baek, Daejeon (KR); Soo-Chang Kim, Daejeon (KR); Yeon-Seung Shin, Daejeon (KR); Yeong-Jin Kim, Daejeon (KR)

(73) Assignees: Electronics and Telecommunications Research Institute, Daejeon (KR); SK Telecom Co., Ltd., Seoul (KR); Ktfreetel Co., Ltd., Seoul (KR)

( * ) Notice: Subject to any disclaimer, the term of this patent is extended or adjusted under 35 U.S.C. 154(b) by 1076 days.

(21) Appl. No.: 11/636,045

(22) Filed: Dec. 8, 2006

(65) Prior Publication Data

US 2007/0133472 A1 Jun. 14, 2007

(30) Foreign Application Priority Data

Dec. 10, 2005 (KR) .................. 10-2005-0121363
May 4, 2006 (KR) .................. 10-2006-0040604

(51) Int. Cl.
*H04W 36/00* (2009.01)
(52) U.S. Cl. ............... 455/438; 455/436; 455/439
(58) Field of Classification Search .......... 455/436, 455/439
See application file for complete search history.

(56) References Cited

U.S. PATENT DOCUMENTS

| | | | | |
|---|---|---|---|---|
| 5,845,208 | A | * | 12/1998 | Hottinen et al. ........ 455/436 |
| 5,913,168 | A | * | 6/1999 | Moreau et al. ........ 455/441 |
| 2003/0119508 | A1 | | 6/2003 | Gwon et al. |
| 2004/0137902 | A1 | * | 7/2004 | Chaskar et al. ........ 455/436 |
| 2005/0059400 | A1 | | 3/2005 | Jagadeesan et al. |

FOREIGN PATENT DOCUMENTS

| KR | 1020020045072 | 6/2002 |
|---|---|---|
| KR | 1020050077122 | 8/2005 |

OTHER PUBLICATIONS

Abhijit Sur, et al; "Multi Layer Rules Based Framework for Vertical Handoff", 2$^{nd}$ International Conference on Broadband Networks, 2005—spot.colorado.edu.

(Continued)

*Primary Examiner* — Pierre-Louis Desir
*Assistant Examiner* — Joshua Schwartz
(74) *Attorney, Agent, or Firm* — Ladas & Parry LLP

(57) ABSTRACT

The present invention relates to a vertical handoff method. According to the present invention, a serving network of a mobile station is determined. Herein, the mobile station that can access a first network having relatively wide service coverage and a second network having relatively narrow service coverage in an area where service coverages of heterogeneous networks are overlapped. When accessing the serving network of the first network, it is determined whether a received signal strength received from the second network is greater than a first threshold value. In addition, a first vertical handoff is decided by using a result of prediction of a transition pattern of the received signal strength that is greater than the first threshold value. When the serving network is the second network, it is determined whether the received signal strength received from the second network is less than a second threshold value. By using a result of prediction of a transition pattern of the received signal strength that is less than the second threshold value, a second vertical handoff is decided. Herein, the first threshold value is greater than the second threshold value.

23 Claims, 9 Drawing Sheets

OTHER PUBLICATIONS

Ravi Sankar, et al; "A Combined Prediction System for Handoffs in Overlaid Wireless Networks" Communications, 1999, ICC '99. 1999 IEEE International Conference on, vol. 2, pp. 760-764.

Serene Huiyi Wang, et al; "A Novel Vertical Handover Scheme for Integrated WLAN and Cellular Wireless Networks"; Communications Systems, 2004, ICCS 2004. The Ninth International Conference on Singapore, China Sep. 6-8, 2004, Piscataway, NJ, USA, IEEE, Sep. 6, 2004.

Daniel Wong et al; "A Pattern Recognition System for Handoff Algorithms"; IEEE Journal on Selected Areas in Communications, IEEE Service Center, Piscataway, US, vol. 18, No. 7, Jul. 2000.

Daniel Wong, et al; "A Handoff Algorithm Using Pattern Recognition"; Universal Personal Communications, 1998. ICUPC '98, IEEE 1998 International Conference on Florence, Italy Oct. 5-9, 1998, New York, NY, USA, IEEE, US, vol. 1, Oct. 5, 1998.

Ravi Narasimhan, et al; "A Handoff Algorithm for Wireless Systems Using Pattern Recognition"; 1998 IEEE.

Hyo Soon Park et al; "Vertical Handoff Procedure and Algorithm between IEEE802.11 WLAN and CDMA Cellular Network"; CIC,2002, LNCS 2524, pp. 103-112, 2003.

Wen-Tsuen Chen et al; "An Adaptive Scheme for Veritcal Handoff in Wireless Overlay Networks"; Proceedings of the Tenth International Conference on Parallel and Distributed Systems (ICPADS'04).

* cited by examiner

METHOD OF VERTICAL HANDOFF

CROSS-REFERENCE TO RELATED APPLICATION

This application claims priority to and the benefit of Korean Patent Application Nos. 10-2005-0121363 and 10-2006-0040604 filed in the Korean Intellectual Property Office on Dec. 10, 2005, and on May 4, 2006 the entire contents of which are incorporated herein by reference.

BACKGROUND OF THE INVENTION (a) Field of the Invention

The present invention relates to a vertical handoff method, and more particularly, the present invention relates to a vertical handoff method of a mobile station that can access a first network having relatively wide service coverage and a second network having relatively narrow service coverage in an area where service coverages of heterogeneous networks are overlapped.

(b) Description of the Related Art

It is expected that a next generation network will evolve into an Internet protocol (IP)-based wireless network with overlapped service areas. That is, heterogeneous wireless networks interact with each other, forming a hierarchically overlapped service environment. In such a heterogeneous wireless network environment, wireless networks having difference characteristics interact with each other and their services areas are hierarchically overlapped with each other so that a service subscriber can selectively and flexibly access an optimal network according to a location of the service subscriber, a propagation condition, service characteristics, and a user preference.

Particularly, among such heterogeneous wireless networks, interaction between a third generation cellular network and a wireless local area network (WLAN) hotspot network is currently occurring.

In general, the third generation cellular network provides global coverage but it has a low data rate with high cost. On the other hand, the WLAN hotspot network provides a limited coverage but it has a high data rate with low cost.

Therefore, seamless service can be guaranteed by informing switching in service connection paths for interaction between the third generation cellular network and the WLAN hotspot network, each having different characteristics, to the mobile station, and accordingly, an optimal service can be provided to a subscriber.

Herein, a handoff that occurs between heterogeneous wireless networks such as between the third generation cellular network and the WLAN hotspot network is called a vertical handoff or an inter-system handoff. The vertical handoff is different from a horizontal handoff that occurs between cells in homogeneous wireless networks.

The vertical handoff uses a signal strength value for a handoff decision, and the signal strength of the vertical handoff is different from that of the horizontal handoff. The horizontal handoff is decided by comparing the corresponding signal strength values of base stations. However, the vertical handoff cannot be decided by comparing signal strengths because there are no signal strengths that can be compared. Since the third generation cellular network has global service coverage, signal strength cannot be used as triggering information for handoff decision. Therefore, the vertical handoff is decided by using a signal strength of a network (e.g., WLAN hotspot network) having a limited service coverage.

In addition, the vertical handoff has a higher probability of occurrence of the ping-pong effect compared to the vertical handoff.

That is, the horizontal handoff can reduce the ping-pong effect by using a signal strength difference between neighboring base stations, a timer, and a hysterisis effect. However, since the vertical handoff has no triggering information that can be compared except for a signal strength of the WLAN hotspot network that provides the limited service coverage, the vertical handoff has the higher probability of occurrence of the ping-pong effect.

FIG. 1 shows the ping-pong effect that occurs in realization of a conventional vertical handoff method.

As shown in FIG. 1, one vertical handoff threshold value is set.

When there is set one vertical handoff threshold value $X_{thresh}$, a signal strength received at a mobile station located in a border area of the WLAN hotspot network is fluctuated in a small range that is close to the vertical threshold value $X_{thresh}$, causing occurrence of the ping-pong effect.

In addition, the mobile station in the middle of performing a vertical handoff to the WLAN hotspot network may be forced to perform a vertical handoff to the third generation cellular network due to the limited coverage of the WLAN hotspot network. Such a phenomenon may increase a failure probability of the vertical handoff.

However, the ping-pong effect in the vertical handoff may give a heavier load to a system compared to the horizontal handoff due to characteristics of the vertical handoff, and therefore it is highly required to minimize the ping-pong effect.

In addition, it is more beneficial for a subscriber to stay longer in the WLAN hotspot network providing the high data rate with low cost, and therefore, a method for supporting the subscriber to stay in the WLAN hotspot network for a longer time period is required.

In order to minimize the ping-pong effect, the following two prior arts have been proposed.

According to one of the two prior arts, a mobile station selects a network that provides optimal performance by using a cost function. In addition, the mobile station monitors whether the selected network provides consistent performance during a stability period Ts and evaluates the monitoring result, and then performs a vertical handoff to the selected network.

Herein, the stability period Ts equals $I_{handoff}+T_{makeup}$. In this case, $I_{handoff}$ denotes a vertical handoff delay time and $T_{makeup}$ denotes a time taken for compensating a loss due to the vertical handoff.

In addition, the monitoring and evaluation of the performance of the selected network may vary depending on a variation of a valid bandwidth and a variation of a received signal strength (RSS) due to mobility of the mobile station.

Therefore, when the mobile station performs the vertical handoff when the mobile station can provide constant performance in a target wireless network during the stability period Ts, that is, when it is expected that the variation of the valid bandwidth due to the variation of the received signal strength is not reduced lower than a reference value, the vertical handoff is performed.

However, although the target wireless network guarantees the constant performance of the mobile station during the stability period Ts, irregular mobility of the mobile station may cause inconsistent performance.

Accordingly, this prior art cannot efficiently prevent the ping-pong effect.

According to another prior art, the mobile station monitors whether a received signal strength received from the WLAN hotspot network is greater or less than the vertical handoff threshold value $X_{thresh}$ within a transition region t. After monitoring $\lambda_n$ sequentially detected received signal strengths, the mobile station decides whether to perform the vertical handoff.

However, the received signal strength of the mobile station cannot be linear due to irregular characteristics of the wireless network environment. Therefore, although values of the $\lambda_n$ received signal strengths exceed the vertical handoff threshold value $X_{thresh}$, there may exist a received signal strength that is lower than the vertical handoff threshold value $X_{thresh}$.

In this case, the mobile station does not perform the vertical handoff and repeats the monitoring of $\lambda_n$ received signal strengths. That is, the mobile station repeats a vertical handoff from the third generation cellular network to the WLAN hotspot network and from the WLAN hotspot network to the third generation cellular network.

Due to such a ping-pong effect, the mobile station cannot find an appropriate time to perform the vertical handoff, and therefore the failure probability of the vertical handoff is increased, causing performance deterioration.

Moreover, conventionally, reduction of one received signal strength among received signal strengths received during a predetermined time period causes the mobile station to not perform a vertical handoff.

However, a received signal strength received from the WLAN hotspot can be temporarily significantly decreased depending on the wireless environment state. Thus, when handoff decision is made by one received signal strength, the vertical handoff decision may not be made even though a strong enough received signal strength is received from the WLAN hotspot network.

However, as described, a received signal strength received from the WLAN hotspot network can be temporarily significantly decreased. Thus, when the handoff decision is made by one received signal strength, the vertical handoff decision may not be made even though a weak received signal strength is received from the WLAN hotspot network. The above phenomenon occurs because a substantial received signal strength received at the mobile station is not in a linear form.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a vertical handoff method having advantages of using a first threshold value in a decision of a first vertical handoff to a second network from a first network, and using a second threshold value that is less than the first threshold value in a decision of a second vertical handoff to the first network from the second network.

In addition, the present invention provides a vertical handoff method using a result of prediction of a transition pattern of a received signal strength received from a second network.

Further, the present invention provides another vertical handoff method using a result of a prediction of a transition pattern of a received signal by using a least squares method.

The present invention provides another vertical handoff method that decides whether to perform a first vertical handoff by predicting a transition pattern of a received signal strength when a received signal strength received from a second network is greater than a first threshold value.

The present invention provides another vertical handoff method that decides whether to perform a second vertical handoff by predicting a transition pattern of a received signal strength when a received signal strength is less than a second threshold value.

An exemplary vertical handoff method according to an embodiment of the present invention is provided to a mobile station that can access a first network having relatively wide service coverage and a second network having relatively narrow service coverage in an area where service coverages of heterogeneous networks are overlapped. The vertical handoff method includes: (a) deciding a serving network of the mobile station; (b) when the serving network is the first network, deciding whether or not to perform first vertical handoff by using a prediction result of a transition pattern of a received signal strength (RSS) received from the second network when the received signal strength is greater than a first threshold value; and (c) when the serving network is the second network, deciding whether or not to perform second vertical handoff by using the prediction result of the transition pattern of the received signal strength received from the second network when the received signal strength is less than a second threshold value. Herein, the first threshold value is greater than the second threshold value.

An exemplary vertical handoff method according to another exemplary embodiment of the present invention is provided to a mobile station that can access a first network having relatively wide service coverage and a second network having relatively narrow service coverage in an area where service coverages of heterogeneous networks are overlapped. The vertical handoff method includes: (a) converting received signal strengths (RSSs) received from the second network during a predetermined time period and predicting a transition pattern; (b) deciding whether or not to perform first vertical handoff to the second network from the first network by using a result of the transition pattern prediction; and (c) deciding whether or not to perform second vertical handoff to the first network from the second network by using a result of the transition pattern prediction.

An exemplary vertical handoff method according to another embodiment of the present invention is provided to a mobile station that can access a first network having a relatively wide service coverage and a second network having a relatively narrow service coverage in an area where service coverages of heterogeneous networks are overlapped, wherein the first network is a serving network of the mobile station. The vertical handoff method includes: (a) checking whether a received signal strength ( ) that is greater than a first threshold value among received signal strengths received from the second network exists; (b) when a received signal strength that is greater than the first threshold value exists, predicting a transition pattern based on the received signal strengths that have been received for a predetermined time period; (c) when the received signal strength increases according to a result of the transition pattern prediction, deciding first vertical handoff to a target network, which is the second network; and (d) when the received signal strength decreases according to a result of the transition pattern prediction, remaining in the serving network.

An exemplary vertical handoff method according to another embodiment of the present invention is provided to a mobile station that can access a first network having relatively wide service coverage and a second network having relatively narrow service coverage in an area where service coverages of heterogeneous networks are overlapped. Herein, the first network is a serving network of the mobile station. The vertical handoff method includes: (a) checking whether a received signal strength (RSS) that is greater than a first threshold value among received signal strengths received from the second network exists; (b) when a received signal strength that is greater than the first threshold value exists, predicting a transition pattern based on the received signal strengths that have been received for a predetermined time period; (c) when the received signal strength increases according to a result of the transition pattern prediction, deciding first vertical handoff to a target network, which is the second network; and (d) when the received signal strength decreases according to a result of the transition pattern prediction, remaining in the serving network.

DETAILED DESCRIPTION OF THE EMBODIMENTS

Figure 1:
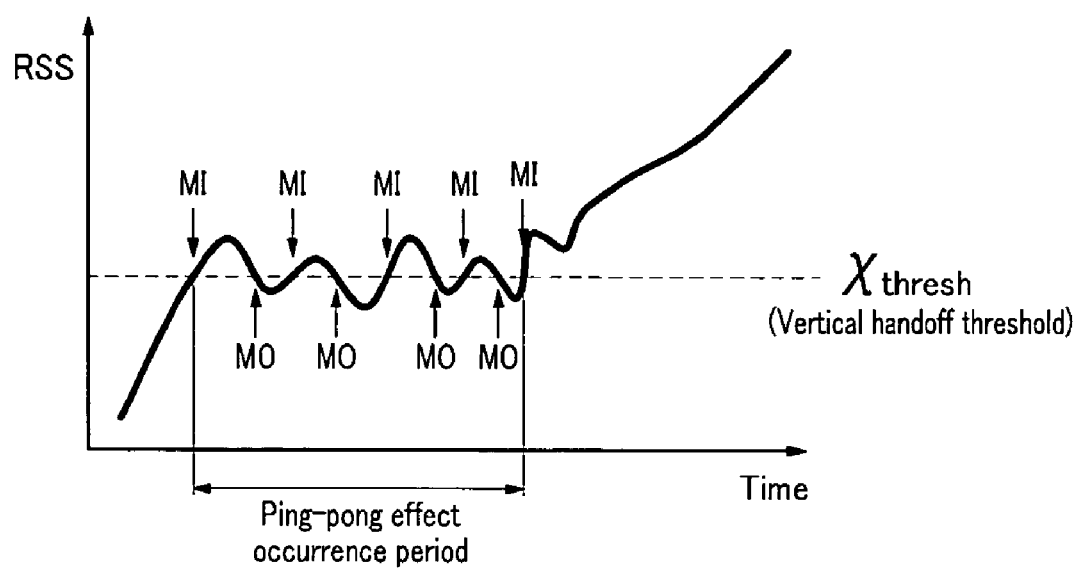
FIG. 1 shows a ping-pong effect due to realization of a conventional vertical handoff method.

An exemplary embodiment of the present invention will hereinafter be described in detail with reference to the accompanying drawings.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification. In addition, throughout this specification and the claims which follow, unless explicitly described to the contrary, the word "comprise/include" or variations such as "comprises/includes" or "comprising/including" will be understood to imply the inclusion of stated elements but not the exclusion of any other elements.

A vertical handoff method according to an exemplary embodiment of the present invention will now be described in more detail with reference to the accompanying drawings.

A vertical handoff is divided into a first vertical handoff and a second vertical handoff.

The first vertical handoff performs a moving in (MI) scenario in which a mobile station moves in from a first network to a second network. The second vertical handoff performs a moving out (MO) scenario in which the mobile station moves out the second network into the first network.

In this case, the first network may be called an overlay network, and has relatively wide service coverage in an area where service coverage is overlapped. For example, the first network is a third generation cellular network providing global coverage.

In addition, the second network may be called an underlay network, and has relatively narrow coverage in an area where service coverage is overlapped. For example, the second network is a WLAN hotspot network providing limited coverage.

The heterogeneous wireless networks have different characteristics from each other. Herein, the different characteristics may be determined on the basis of service coverage and a wireless access method.

Such a vertical handoff over heterogeneous wireless networks is performed through the following three processes.

The first process is detecting an access network that can be utilized by the mobile station, and is called "network detection".

The second process is deciding when to use a random access network by a mobile station, and is called "handoff decision". The vertical handoff may critically affect a quality of service of a subscriber.

The third process is executing a handoff for accessing a target access network after the vertical handoff decision process, and is called "handoff execution".

Among the above three processes, the handoff decision may use the following estimation value for selection an optimal network. That is, a received signal strength, a service type, a data rate, a quality of service (QoS), and speed/direction of a network, detected by a mobile station, should be taken into account in selection of the optimal network.

However, the vertical handoff decision method according to the exemplary embodiment of the present invention will use only a received signal strength (RSS) from the second network having a narrow service coverage.

Figure 2:
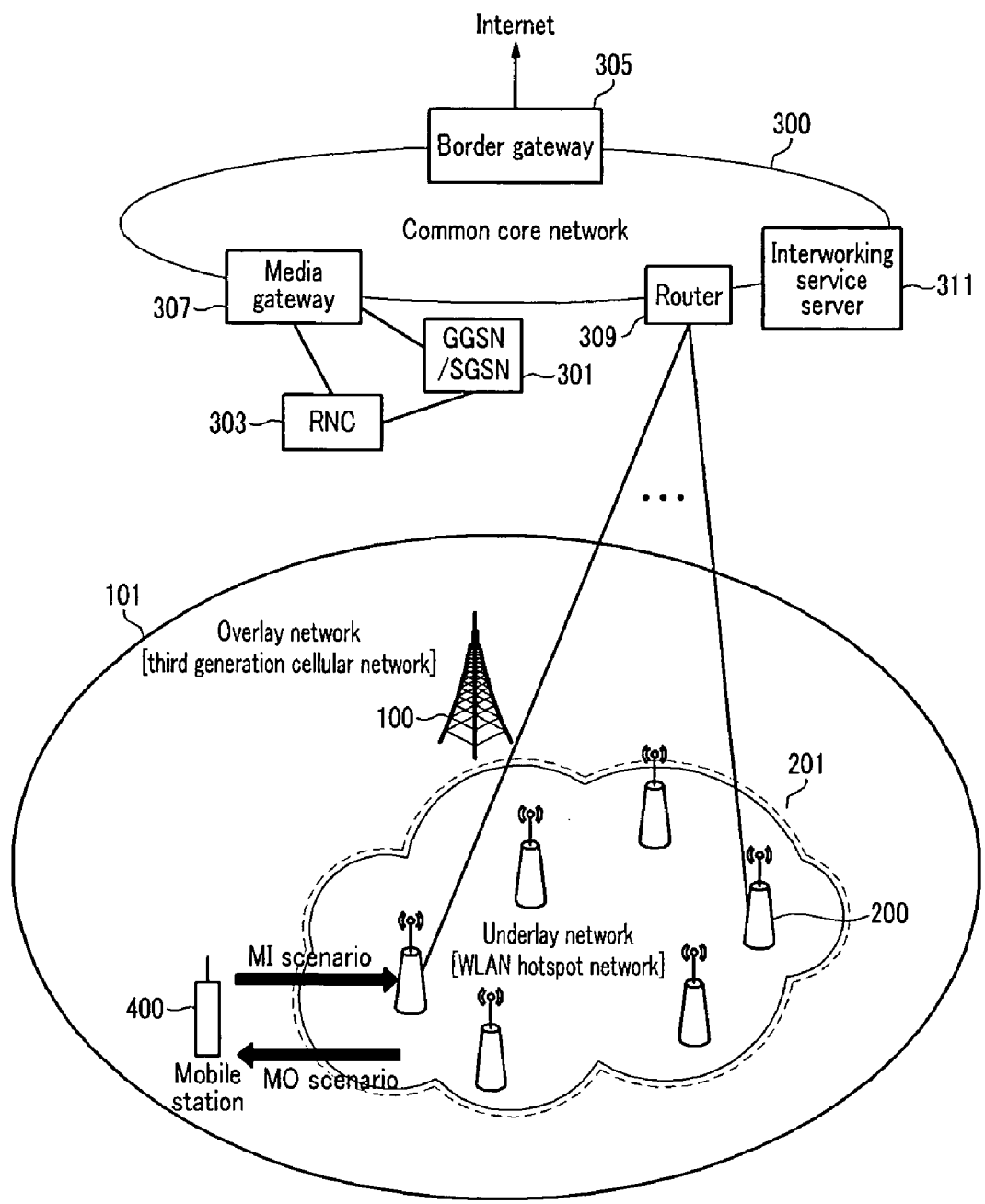
FIG. 2 is a configuration diagram of a network where a $3^{rd}$ generation cellular network and a hot spot of a wireless local area network (WLAN) are overlapped according to an exemplary embodiment of the present invention.

FIG. 2 shows a configuration of a network where a third generation cellular network and a WLAN hotspot are overlapped, and this shows a theoretical propagation range of each network.

According to such an overlapped network configuration, a plurality of micro cells or pico cells in one macro cell form a hot-spot area, and IP-based heterogeneous wireless network systems having overlapped service areas interact with each other.

As shown in FIG. 2, a network is formed of a third generation (3G) cellular network 100, a wireless local area network (WLAN) hotspot network 200, and a common core network 300.

The common core network 300 provides mutual interworking between the 3G cellular network 100 and the WLAN hotspot network 200.

Such a common core network 300 includes a Gateway GPRS support node (GGSN)/serving GPRS support node (SGSN) 301, a radio network controller (RNC) 303, a border gateway 305, a media gateway 307, and a router 309.

Herein, the GGSN/SGSN 301 and the RNC 303 are access nodes respectively forming a wireless access network and a core network of the 3G cellular network 100.

The border gateway 305 provides access from the common core network 300 to an Internet.

The media gateway (MG) 307 is a connection point between the 3G cellular network 100 and the common core network 300.

The router 309 provides access from the WLAN hotspot network 200 to the common core network 300.

Such a common core network 101 includes an interworking service server 311.

A propagation range 101 of the 3G cellular network 100 and a propagation range 201 of the WLAN hotspot network 200 are different from each other, and the ranges 101 and 102 are overlapped.

In addition, a mobile station 400 is provided as a multi-mode mobile station so that the mobile station 400 can access all wireless network systems connected to the common core network 300. Such a multi-mode mobile station 400 performs a vertical handoff in MI and MO scenarios.

Figure 3:
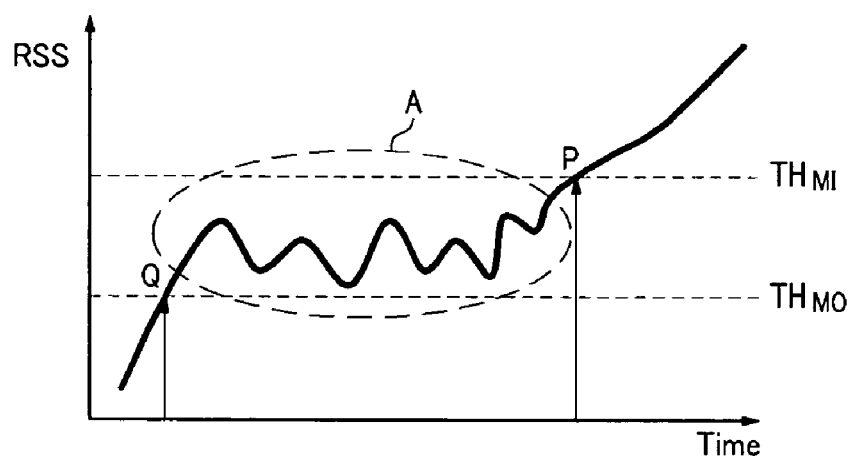
FIG. 3 to FIG. 5 show examples of prevention of a ping-pong effect in a vertical handoff method according to the exemplary embodiment of the present invention.
Figure 4:
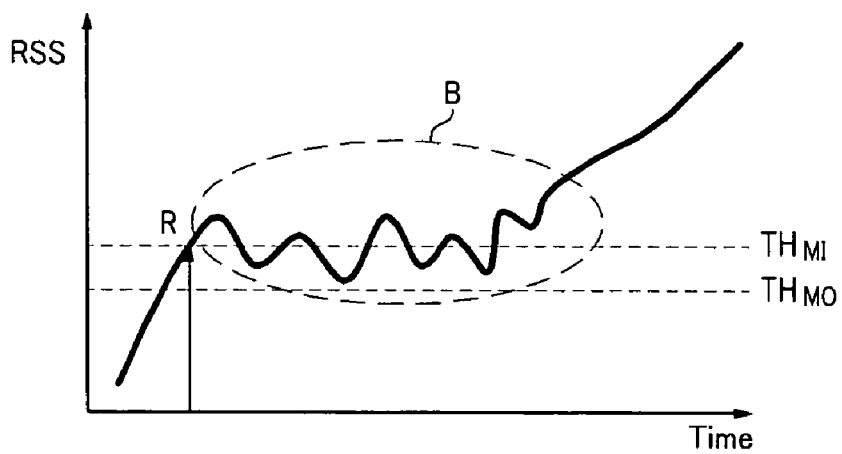
Figure 5:
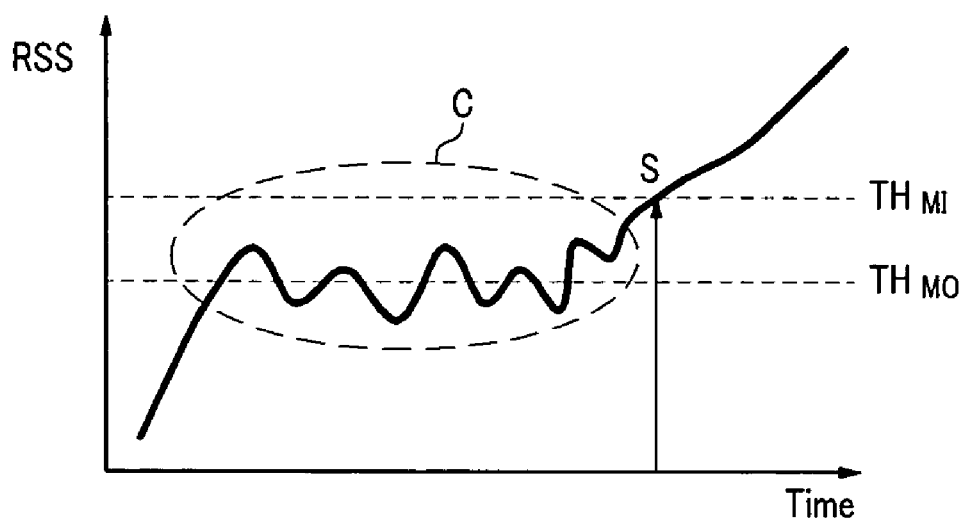

FIG. 3 to FIG. 5 respectively show examples of prevention of the ping-pong effect in the vertical handoff method according to the exemplary embodiment of the present invention.

As shown in FIG. 3 to FIG. 5, a first threshold value $TH_{MI}$ for a first vertical handoff decision and a second threshold value $TH_{MO}$ for a second vertical handoff decision are set to be different from each other. A relationship between the first threshold value $TH_{MI}$ and the second threshold value $TH_{MO}$ is given as Equation 1.

$$TH_{MI} > TH_{MO} \quad \text{[Equation 1]}$$

In this case, the first threshold value $TH_{MI}$ is set to be greater than the second threshold value $TH_{MO}$. Thus, the first vertical handoff is decided when a received signal strength used in the first vertical handoff decision is significantly greater than that used in the second vertical handoff decision.

That is, the first vertical handoff to the second network (i.e. WLAN hotspot network) is prevented from being requested as soon as the second vertical handoff to the first network (i.e., third generation cellular network) from the second network is decided.

In addition, the mobile station can stay longer in the second network (i.e., WLAN hotspot network) that provides a high data rate with low cost by reducing the second threshold value for the second vertical handoff decision.

In addition, the ping-pong effect between the first vertical handoff and the second vertical handoff can be avoided by setting threshold values for the respective handoffs to be different from each other.

That is, in FIG. 3, the first vertical handoff is decided at P where the received signal strength is greater than the first threshold value $TH_{MI}$. In addition, the second vertical handoff is decided at Q where the received signal strength is less than the second threshold value $TH_{MO}$. Therefore, although the received signal strength has a small variation A within P and Q, the ping-pong effect does not occur.

In FIG. 4, the first vertical handoff is decided at R. Therefore, although fluctuation B of the received signal strength occurs after R, the ping-pong effect does not occur.

In FIG. 5, the first vertical handoff is decided at S. Therefore, although fluctuation C of the received signal strength occurs before S, the ping-pong effect does not occur.

Figure 6:
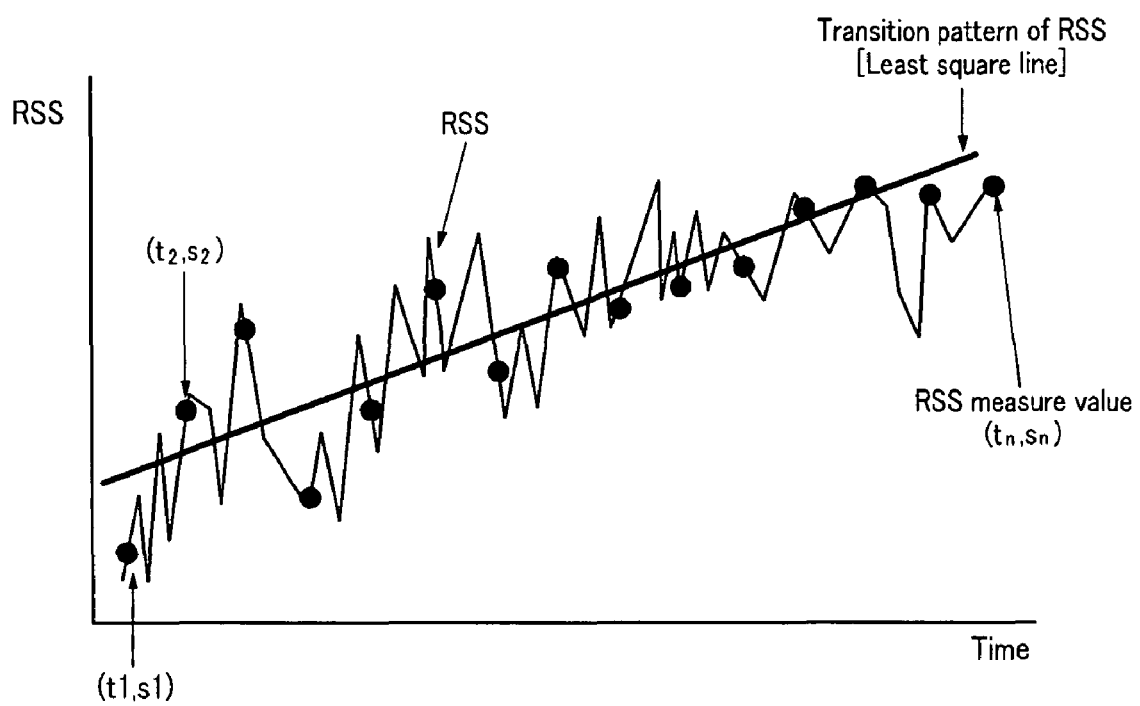
FIG. 6 to FIG. 7 show examples of transition pattern prediction of a received signal strength in the vertical handoff method according to the exemplary embodiment of the present invention.
Figure 7:
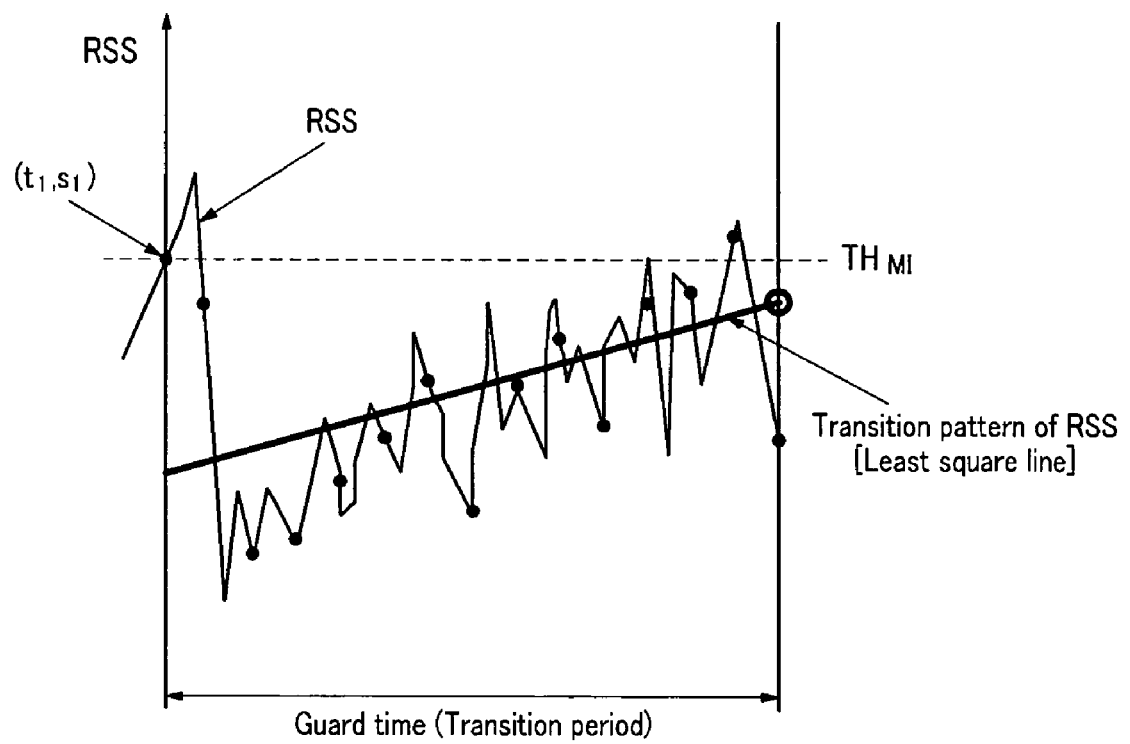

FIG. 6 to FIG. 7 respectively show exemplary predictions of a received signal strength transition pattern in the vertical handoff method according to the exemplary embodiment of the present invention.

That is, as shown in FIG. 6, a received signal strength transition pattern in a linear form can be predicted on the basis of sets $(t_1,s_1), (t_2,s_2), \ldots, (t_n,s_n)$ formed by approximating periodically detected received signal strengths. The first or second vertical handoff is decided by using the predicted transition pattern prediction of the received signal strength.

In this case, a variation pattern of a received signal strength received from the second network can be predicted by using a best-fit curve derived by using a method of least squares.

In addition, the vertical handoff execution is determined by using a sign (i.e., positive (+) sign or negative (−) sign) of the received signal strength transition pattern.

Therefore, a method for predicting a received signal strength transition pattern by using a least squares method is proposed. Herein, the least squares method obtains a least squares line that has a minimum sum of squared deviations from a set of the received signal strengths received from the second network during a predetermined time and range.

The method for predicting the received signal strength transition pattern by using the least squares method will now be described in more detail.

A least squares line S which is a line that indicates a transition pattern of a received signal strength is obtained by approximation of a received signal strength sampling set $\{(t_1, s_1), (t_2,s_2), \ldots, (t_n,s_n), n \geq 2\}$, and it can be represented as given in Equation 2.

$$S_i = \sigma + \theta t_i \quad \text{[Equation 2]}$$

Herein, n denotes a total number of received signal strength detections for an accurate vertical handoff decision, and is based on an experimental result. In addition, $t_i$ denotes a predetermined time (i.e., X-axis) taken until termination of the detection of the received signal strength for the vertical handoff decision. Si denotes a received signal strength of a least squares line S, and corresponds to the Y-axis. $\sigma$ denotes a crossing region of the least squares line S and the Y-axis, and $\theta$ denotes a slope of the least squares line S.

When ti and Si are given, $\sigma$ and $\theta$ are unknown coefficients. In addition, $\theta$ is a main factor that determines the received signal strength transition pattern.

The best-fit curve function f(X) that estimates a least squares line has a least squares error $\prod$ for example, as given in Equation 3.

$$\prod = \sum_{i=1}^{n}[s_i - f(t_i)]^2 = \sum_{i=1}^{n}[s_i - (\sigma + \theta t_i)]^2 = \min \quad \text{[Equation 3]}$$

The unknown coefficients $\sigma$ and $\theta$ calculate first derivatives of zero as given in Equation 4 to obtain the least squares error $\prod$.

$$\begin{cases} \dfrac{\partial \prod}{\partial \sigma} = 2\sum_{i=1}^{n}[s_i - (\sigma + \theta t_i)] = 0 \\ \dfrac{\partial \prod}{\partial \theta} = 2\sum_{i=1}^{n}t_i[s_i - (\sigma + \theta t_i)] = 0 \end{cases} \quad \text{[Equation 4]}$$

Then, $\sigma$ and $\theta$ can be calculated by Equation 5, extended from Equation 4.

$$\begin{cases} \sigma = \dfrac{\sum_{i=1}^{n}s_i \sum_{i=1}^{n}t_i^2 - \sum_{i=1}^{n}t_i \sum_{i=1}^{n}t_i s_i}{n\sum_{i=1}^{n}t_i^2 - \left(\sum_{i=1}^{n}t_i\right)^2} \\ \theta = \dfrac{n\sum_{i=1}^{n}t_i s_i - \sum_{i=1}^{n}t_i \sum_{i=1}^{n}s_i}{n\sum_{i=1}^{n}t_i^2 - \left(\sum_{i=1}^{n}t_i\right)^2} \end{cases} \quad \text{[Equation 5]}$$

By using Equation 2 to Equation 5, a least squares line that indicates a received signal strength transition pattern can be calculated.

When the slope of the least squares line has a positive (+) sign, it is predicted that the mobile station is moving in the second network, that is, the WLAN hotspot network. In addition, when the slope of the least squares line has a negative (−) sign, it is predicted that the mobile station is moving out the second network, that is, the WLAN hotspot network.

Whether to perform the first vertical handoff or the second vertical handoff is determined in accordance with the least squares line, that is, a slope sign (+ or −) of the received signal strength transition pattern.

However, prediction of the received signal strength transition pattern by using the least squares method may cause several unusual scenarios. This will be described with reference to FIG. 7.

That is, as shown in FIG. 7, although the slope of the least squares line has the positive (+) sign, the received signal strength of the least squares line may not be greater than the first threshold value $TH_{MI}$. This is caused by a sudden increase of the received signal strength due to a wireless environment is state.

$$s_1 \geq TH_{MI}, \{s_2, s_3, \ldots, s_n\} \leq THMI, \{s_2 < s_3, s_3 < s_4, \ldots, s_{n-1} < s_n\}$$ [Equation 6]

In order to be prepared for the unusual scenario, it is determined whether the received signal strength transition pattern has a positive sign, and a received signal strength of a least squares line at the end of a given time period with the first threshold value $TH_{MI}$ as given in Equation 7.

$$\sigma + \theta t_n \geq TH_{MI}$$ [Equation 7]

Where $\sigma + \theta t_n$ denotes a value of the least squares line, that is, a received signal strength of the least squares line at the end of the given time period.

When Equation 7 is satisfied, execution of the first vertical handoff is decided.

When Equation 7 is not satisfied, it is decided to stay in a serving network. In addition, a process for detecting a received signal strength that is greater than the first threshold value is provided.

Based on the above-described methods, a series of vertical handoff processes will be described.

Figure 8:
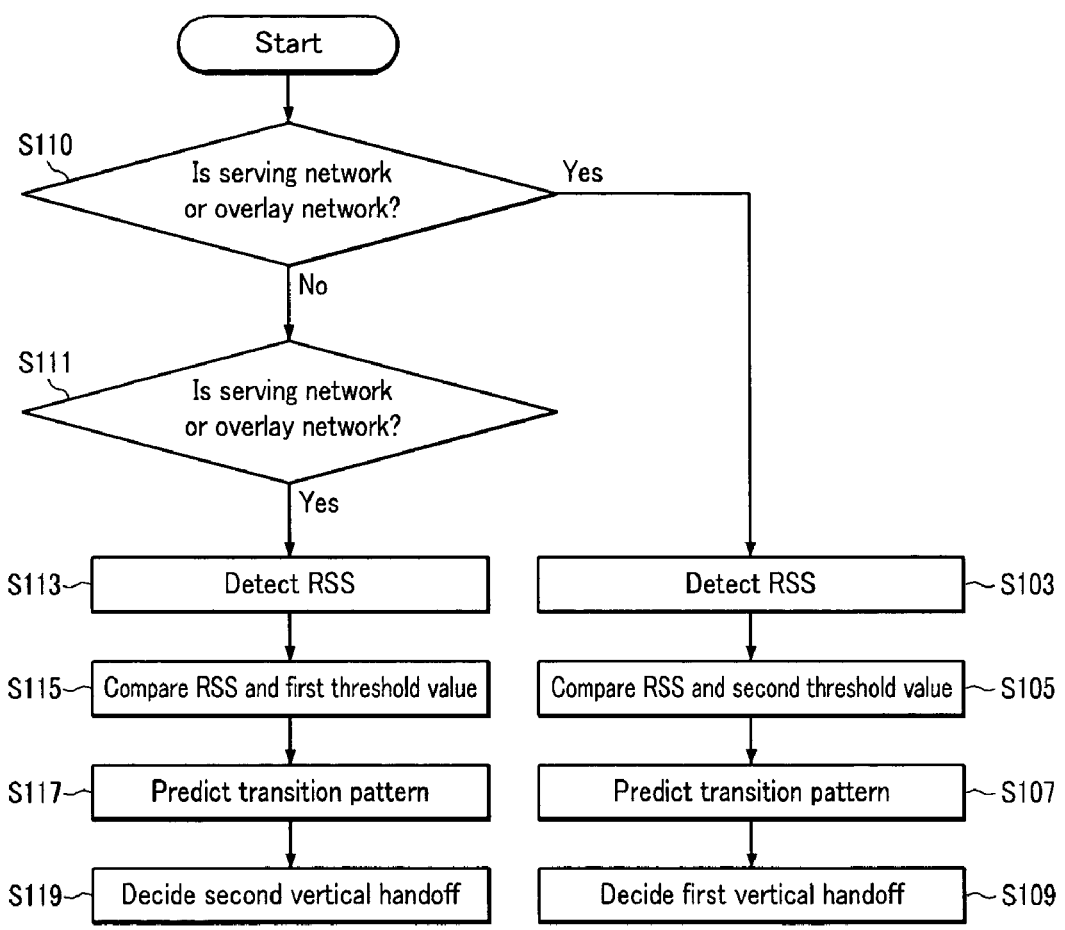
FIG. 8 shows a vertical handoff method according to a first exemplary embodiment of the present invention.

FIG. 8 shows a vertical handoff process according to the first exemplary embodiment of the present invention.

As shown in FIG. 8, the mobile station determines a serving network that the mobile station is currently accessing.

That is, the mobile station determines whether the serving network is the first network, in step S101.

When it is determined that the serving network is the first network in step S101, a process for the first vertical handoff decision is performed.

That is, a received signal strength received from the second network is detected, in step S103.

Then, the received signal strength detected in step S103 and the first threshold value $TH_{MI}$ are compared in step S105.

A transition pattern of the received signal strength is predicted in step S107.

It is decided whether to perform the first vertical handoff to a target network, that is, to the second network, by using a result of the comparison in step S105 and the transition pattern predicted in step 107.

When it is determined in step S101 that the serving network is not the first network, it is determined whether the serving network is the second network in step S111.

When it is determined in S111 that the serving network is the second network, a process for the second vertical handoff decision is performed.

That is, a received signal strength from the second network is detected in S113.

Then, the received signal strength detected in step S113 and the second threshold value $TH_{MO}$ are compared in step S115.

A transition pattern of the received signal strength is predicted in step S117.

Then, it is determined in step S119 whether to perform the second vertical handoff to a target network, that is, to the first network, in step S119, by using a result of the comparison in step S115 and the transition pattern predicted in step S117.

Figure 9:
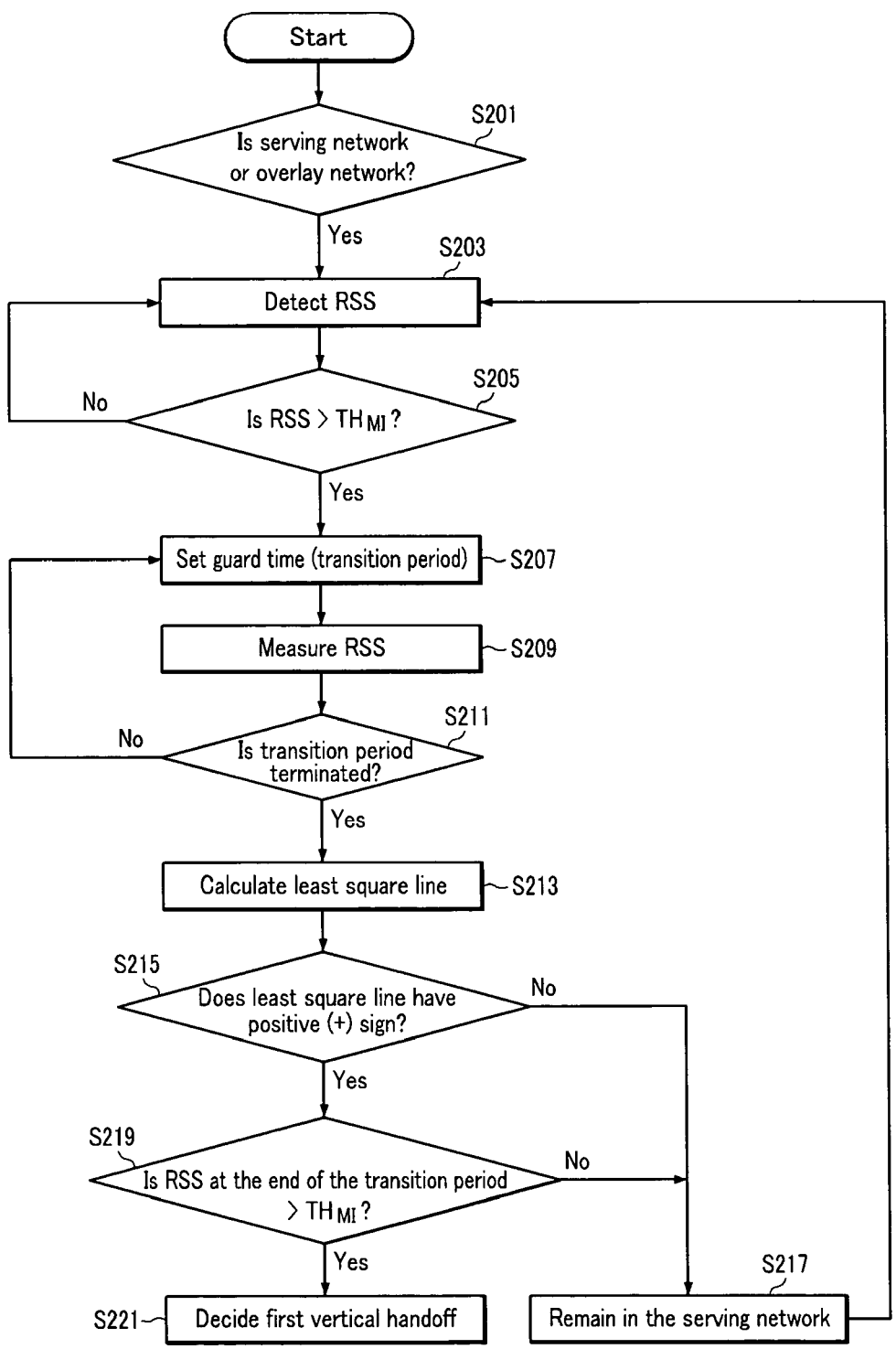
FIG. 9 shows a vertical handoff method according to a second exemplary embodiment of the present invention.

FIG. 9 shows a vertical handoff process according to the second exemplary embodiment of the present invention, and shows a first vertical handoff process in the case that the first network is a serving network.

As shown in FIG. 9, a mobile station that is currently accessing the first network in step S210 detects a received signal strength that is periodically transmitted from the second network in step S203.

Then, it is determined in step S205 whether there exists a received signal strength that is greater than a first predetermined threshold value $TH_{MI}$ among the received signal strengths detected in step S203. In this case, when no received signal strength is greater than the first threshold value $TH_{MI}$, the steps S203 and S205 are repeated.

When a received signal strength greater than the first threshold value $TH_{MI}$ exists in step S205, a timer for guard time, that is, a transition period, is set, in step S207.

Then, until the transition period set in step S207 is terminated, a received signal strength received from the second network is periodically measured and collected, in steps S209 and S211.

When the transition period is terminated, a set of received signal strengths measured in steps S209 and S211 is approximated and a least linear squares line that represents a transition pattern of the received signal strengths is derived from the approximation, in step S213.

For a further description related to the step S213, refer to FIG. 6 and FIG. 7.

Subsequently, whether to perform the first vertical handoff is determined by checking a slope sign of the least linear square line derived in step S213.

That is, it is checked whether the slope θ is greater than zero, in step S215.

When it is determined in step S215 that the slope θ is greater than zero, the transition pattern of the received signal strengths has a positive value, and therefore the first vertical handoff is determined to be performed. In this case, a received signal strength received at the time of termination of the transition period in steps S209, S211, and S213 and the first threshold value $TH_{MI}$ are compared in step S217.

When a result of the comparison in step S217 shows that the received signal strength is greater than the first threshold value $TH_{MI}$, the first vertical handoff is determined to be performed, in step S219. That is, the mobile station can perform the first vertical handoff to a target network, which is the second network.

When the result of the comparison in step S217 shows that the received signal strength is less than the first threshold value $TH_{MI}$, the mobile station remains in the serving network, which is the first network, in step S223.

For a further description of the comparison process performed in step S217, refer to the descriptions related to FIG. 6 and FIG. 7.

In addition, when the result of the determination in step S215 shows that the slope θ is not greater than zero, the slope θ has a negative (−) sign in step S221 and therefore the mobile station remains in the serving network, in step S223.

After the step S223, the process returns to the step S203 and repeats the steps S203 to S223.

Figure 10:
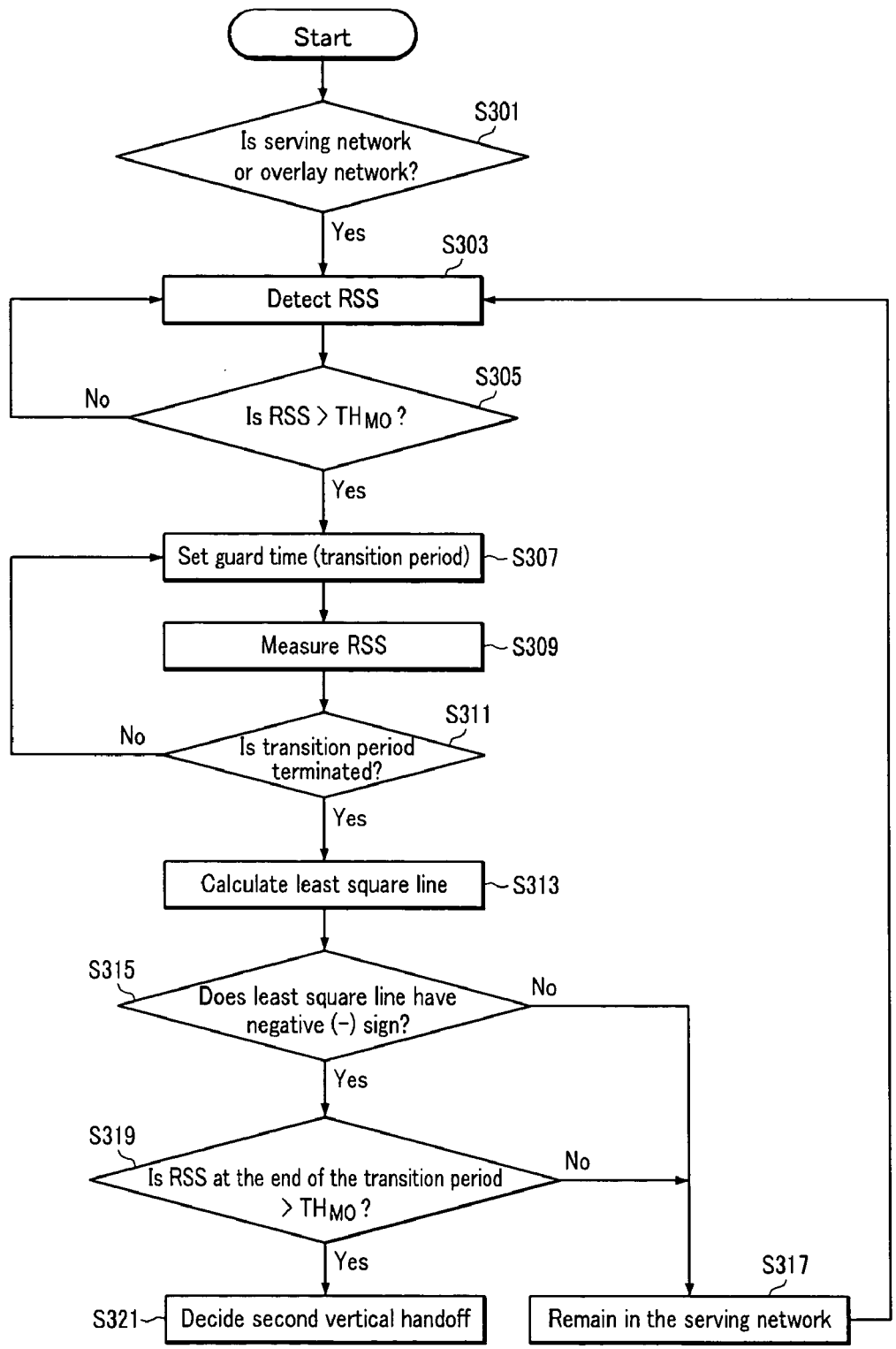
FIG. 10 shows a vertical handoff method according to a third exemplary embodiment of the present invention.

FIG. 10 shows a vertical handoff process according to a third exemplary embodiment of the present invention, and it shows a second vertical handoff when the serving network is the second network. The second vertical handoff process is similar to the first vertical handoff process.

As shown in the FIG. 10, the mobile station accessing the second network in step S301 periodically detects a received signal strength received from the second network, in step S303.

Then, it is checked in step S305 whether a received signal strength that is greater than a second threshold value $TH_{MO}$ exists among the received signal strengths detected in step S303. In this case, when no received signal strength is greater than the second threshold value $TH_{MO}$ among the detected received signal strengths, the steps S303 and S305 are repeated.

When a received signal strength greater than the second threshold value $TH_{MO}$ is detected in step S305, the mobile station sets a timer for a guard time. That is, the mobile station sets a transition period in step S307.

Then, the mobile station periodically measures and collects a received signal strength received from the second network until the transition period is terminated, in steps S307 and S309.

When the transition period is terminated in step S311, the received signal strengths measured in steps S307 and S308 are approximated and a least squares linear line that represents a transition pattern of the received signal strength is derived from the approximation in step S313.

Then, it is checked whether a slope θ of the least squares line derived in step S313 has a negative sign, in step S315.

When it is checked that the slope θ of the least squares line has the negative sign, the transition pattern of the received signal strength has a negative sign. Therefore, the mobile station determines to perform a second vertical handoff to a target network, which is the first network. In this case, the received signal strength received at the time of termination of the transition period in steps S307, S309, and S311 is compared with the second threshold value $TH_{MO}$, in step S317.

When a result of the comparison in step S317 shows that the received signal strength is less than the second threshold value $TH_{MO}$, the mobile station determines to perform the second vertical handoff, in step S319. That is, the mobile station can perform the second vertical handoff to the target network, which is the first network.

However, when the result of the comparison in step S317 shows that the received signal strength is greater than the second threshold value $TH_{MO}$, the mobile station remains in the serving network, that is, the second network, in step S323.

As shown in FIG. 9, a description of the step S317 is similar to the description related to FIG. 6 and FIG. 7.

When the slope of the least squares line in the step S315 does not have the negative sign, the slope has a positive sign, and therefore the mobile station remains in the serving network, in step S323.

After the step S323, the steps S303 to S323 are repeated.

According to the above description configuration, the ping-pong effect due to unnecessary vertical handoff can be prevented.

In addition, performance deterioration due to an increase of handoff delay, a decrease in the amount of data throughput, degradation of battery efficiency of the mobile station, and an increase of vertical handoff failure probability can be prevented.

The above-described exemplary embodiment of the present invention may be realized by an apparatus and a method, but it may also be realized by a program that realizes functions corresponding to configurations of the exemplary embodiment or a recording medium that records the program. Such a realization can be easily performed by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A vertical handoff method of a mobile station that can access a first network having relatively wide service coverage and a second network having relatively narrow service coverage in an area where service coverages of heterogeneous networks are overlapped, the vertical handoff method comprising:

(a) determining a serving network of the mobile station;

(b) when the serving network is the first network, deciding whether or not to perform first vertical handoff by using a prediction result of a transition pattern of a received signal strength (RSS) received from the second network when the received signal strength is greater than a first threshold value; and (c) when the serving network is the second network, deciding whether or not to perform second vertical handoff by using the prediction result of the transition pattern of the received signal strength received from the second network when the received signal strength is less than a second threshold value, wherein the first threshold value is greater than the second threshold value, and the prediction result of the transition pattern of the received signal strength comprises calculating linear square lines of the received signal strengths by using a least squares method, wherein when a slope of the linear square line has a positive (+) sign, predicting moving of the mobile station into the second network by the transition pattern, and wherein when a slope of the linear square line has a negative (−) sign, predicting moving of the mobile station out of the second network by the transition pattern, wherein the transition pattern is calculated using the formula $$\begin{cases} \sigma = \dfrac{\sum\limits_{i=1}^{n} s_i \sum\limits_{i=1}^{n} t_i^2 - \sum\limits_{i=1}^{n} t_i \sum\limits_{i=1}^{n} t_i s_i}{n \sum\limits_{i=1}^{n} t_i^2 - \left(\sum\limits_{i=1}^{n} t_i\right)^2} \\ \theta = \dfrac{n \sum\limits_{i=1}^{n} t_i s_i - \sum\limits_{i=1}^{n} t_i \sum\limits_{i=1}^{n} s_i}{n \sum\limits_{i=1}^{n} t_i^2 - \left(\sum\limits_{i=1}^{n} t_i\right)^2} \end{cases}$$

where n denotes a total number of received signal strength detections for an accurate vertical handoff decision, and is based on an experimental result, $t_i$ denotes a predetermined time (i.e., X-axis) taken until termination of the detection of the received signal strength for the vertical handoff decision, Si denotes a received signal strength of a least squares line S, and corresponds to the Y-axis, σ denotes a crossing region of the least squares line S and the Y-axis, and θ denotes a slope of the least squares line S.

2. The vertical handoff method of claim 1, wherein:
the first network includes a third generation cellular network that provides global service coverage,
the second network includes a wireless local area network (WLAN) hotspot network that provides limited service coverage.

3. The vertical handoff method of claim 1, wherein (b) comprises:
(i) when a received signal strength that is greater than the first threshold value is received, predicting a transition pattern based on received signal strengths received from the second network during a predetermined time period;
(ii) deciding the first vertical handoff to the second network when the received signal strength increases according to a result of the prediction; and
(iii) remaining in the first network when the received signal strength decreases according to a result of the prediction.

4. The vertical handoff method of claim 1, wherein (c) comprises:
(i) when a received signal strength that is less than the second threshold value is received, predicting a transition pattern based on received signal strengths received from the second network during a predetermined time period;
(ii) deciding the second vertical handoff to the first network when the received signal strength decreases according to a result of the prediction; and
(iii) remaining in the second network when the received signal strength increases according to a result of the prediction.

5. The vertical handoff method of claim 3, wherein (i) comprises converting the received signal strengths into a linear value and predicting the transition pattern.

6. The vertical handoff method of claim 5, wherein (i) comprises predicting the transition pattern by using the least squares method.

7. The vertical handoff method of claim 4, wherein (i) comprises converting the received signal strengths into a linear value and predicting the transition pattern.

8. The vertical handoff method of claim 7, wherein (i) comprises predicting the transition pattern by using the least squares method.

9. A vertical handoff method of a mobile station that can access a first network having relatively wide service coverage and second network having a relatively narrow service coverage in an area where service coverages of heterogeneous networks are overlapped, the vertical handoff method comprising:
(a) converting received signal strengths (RSSs) received from the second network during a predetermined time period into linear values and predicting a transition pattern;
(b) deciding whether or not to perform first vertical handoff to the second network from the first network by using a result of the transition pattern prediction; and
(c) deciding whether or not to perform second vertical handoff to the first network from the second network by using a result of the transition pattern prediction,
wherein (a) comprises:
(i) calculating linear square lines of the received signal strengths by using a least squares method;
(ii) when a slope of the linear square line has a positive (+) sign, predicting moving of the mobile station into the second network by the transition pattern; and
(iii) when a slope of the linear square line has a negative (−) sign, predicting moving of the mobile station out of the second network by the transition pattern,
wherein the transition pattern is calculated using the formula $$\begin{cases} \sigma = \dfrac{\sum_{i=1}^{n} s_i \sum_{i=1}^{n} t_i^2 - \sum_{i=1}^{n} t_i \sum_{i=1}^{n} t_i s_i}{n \sum_{i=1}^{n} t_i^2 - \left(\sum_{i=1}^{n} t\right)^2} \\ \theta = \dfrac{n \sum_{i=1}^{n} t_i s_i - \sum_{i=1}^{n} t_i \sum_{i=1}^{n} s_i}{n \sum_{i=1}^{n} t_i^2 - \left(\sum_{i=1}^{n} t\right)^2} \end{cases}$$

where n denotes a total number of received signal strength detections for an accurate vertical handoff decision, and is based on an experimental result, $t_i$ denotes a predetermined time (i.e., X-axis) taken until termination of the detection of the received signal strength for the vertical handoff decision, Si denotes a received signal strength of a least squares line S, and corresponds to the Y-axis, σ denotes a crossing region of the least squares line S and the Y-axis, and θ denotes a slope of the least squares line S.

10. The vertical handoff method of claim 9, wherein (b) comprises:
deciding the first vertical handoff when the slope of the linear square line has a positive (+) sign; and
deciding remaining in the first network when the slope of the linear square line has a negative (−) sign.

11. The vertical handoff method of claim 9, wherein:
(c) comprises:
deciding the second vertical handoff when the slope of the linear square line has a negative (−) sign; and
deciding remaining in the second network when the slope of the linear square line has a positive (+) sign.

12. The vertical handoff method of claim 9, wherein (i) comprises:
acquiring a linear square line by approximating a set of sampled received signal strengths; and
acquiring a slope of the linear least line by using a zero first derivative for a least squares error.

13. A vertical handoff method of a mobile station that can access a first network having relatively wide service coverage and a second network having relatively narrow service coverage in an area where service coverages of heterogeneous networks are overlapped, wherein the first network is a serving network of the mobile station, the vertical handoff method comprising:
(a) checking whether there exists a received signal strength (RSS) that is greater than a first threshold value among received signal strengths received from the second network;
(b) when there exists a received signal strength that is greater than the first threshold value, predicting a transition pattern based on the received signal strengths received for a predetermined time period;

(c) when the received signal strength increases according to a result of the transition pattern prediction, deciding a first vertical handoff to a target network, which is the second network; and (d) when the received signal strength decreases according to a result of the transition pattern prediction, remaining in the serving network, wherein (b) further comprises calculating linear square lines of the received signal strengths by using a least squares method, wherein (c) further comprises when a slope of the linear square line has a positive (+) sign, deciding the first vertical handoff, and wherein (d) further comprises when a slope of the linear square line has a negative (−) sign, remaining in the serving network, wherein the transition pattern is calculated using the formula $$\begin{cases} \sigma = \dfrac{\sum_{i=1}^{n} s_i \sum_{i=1}^{n} t_i^2 - \sum_{i=1}^{n} t_i \sum_{i=1}^{n} t_i s_i}{n \sum_{i=1}^{n} t_i^2 - \left(\sum_{i=1}^{n} t\right)^2} \\ \theta = \dfrac{n \sum_{i=1}^{n} t_i s_i - \sum_{i=1}^{n} t_i \sum_{i=1}^{n} s_i}{n \sum_{i=1}^{n} t_i^2 - \left(\sum_{i=1}^{n} t\right)^2} \end{cases}$$

where n denotes a total number of received signal strength detections for an accurate vertical handoff decision, and is based on an experimental result, $t_i$ denotes a predetermined time (i.e., X-axis) taken until termination of the detection of the received signal strength for the vertical handoff decision, Si denotes a received signal strength of a least squares line S, and corresponds to the Y-axis, σ denotes a crossing region of the least squares line S and the Y-axis, and θ denotes a slope of the least squares line S.

14. The vertical handoff method of claim 13, wherein (c) comprises:
   when the received signal strength increases, checking whether a received signal strength received at the end of the predetermined time period is greater than the first threshold value; and
   when the received signal strength received at the end of the predetermined time period is greater than the first threshold value, determining the first vertical handoff.

15. The vertical handoff method of claim 13, wherein (c) further comprises remaining in the serving network when the received signal strength received at the end of the predetermined time period is less than the first threshold value.

16. A vertical handoff method of a mobile station that can access a first network having relatively wide service coverage and a second network having relatively narrow service coverage in an area where service coverages of heterogeneous networks are overlapped, wherein the second network is a serving network of the mobile station, the vertical handoff method comprising:
   (a) checking whether there exists a received signal strength (RSS) that is greater than a second threshold value among received signal strengths received from the second network;
   (b) when there exists a received signal strength that is greater than the second threshold value, predicting a transition pattern based on the received signal strengths received for a predetermined time period;
   (c) when the received signal strength increases according to a result of the transition pattern prediction, determining a second vertical handoff to the first network which is a target network; and
   (d) when the received signal strength decreases according to a result of the transition pattern prediction, remaining in the serving network, wherein (b) further comprises calculating linear square lines of the received signal strengths by using a least squares method, wherein (c) further comprises when a slope of the linear square line has a negative (−) sign, determining the second vertical handoff, and wherein (d) further comprises when a slope of the linear square line has a positive (+) sign, remaining in the serving network, wherein the transition pattern is calculated using the formula $$\begin{cases} \sigma = \dfrac{\sum_{i=1}^{n} s_i \sum_{i=1}^{n} t_i^2 - \sum_{i=1}^{n} t_i \sum_{i=1}^{n} t_i s_i}{n \sum_{i=1}^{n} t_i^2 - \left(\sum_{i=1}^{n} t\right)^2} \\ \theta = \dfrac{n \sum_{i=1}^{n} t_i s_i - \sum_{i=1}^{n} t_i \sum_{i=1}^{n} s_i}{n \sum_{i=1}^{n} t_i^2 - \left(\sum_{i=1}^{n} t\right)^2} \end{cases}$$

where n denotes a total number of received signal strength detections for an accurate vertical handoff decision, and is based on an experimental result, $t_i$ denotes a predetermined time (i.e., X-axis) taken until termination of the detection of the received signal strength for the vertical handoff decision, Si denotes a received signal strength of a least squares line S, and corresponds to the Y-axis, σ denotes a crossing region of the least squares line S and the Y-axis, and θ denotes a slope of the least squares line S.

17. The vertical handoff method of claim 16, wherein (c) comprises:
   when the received signal strength decreases, checking whether a received signal strength received at the end of the predetermined time period is less than the second threshold value; and
   when the received signal strength received at the end of the predetermined time period is less than the second threshold value, deciding the second vertical handoff.

18. The vertical handoff method of claim 17, wherein (c) further comprises remaining in the serving network when the received signal strength received at the end of the predetermined time period is greater than the second threshold value.

19. The vertical handoff method of claim 13, comprising repeating the steps (a) to (d) after the remaining in the serving network.

20. The vertical handoff method of claim 16, comprising repeating the steps (a) to (d) after the remaining in the serving network.

21. The vertical handoff method of claim 13, wherein (b) comprises using a linear square line derived by using a least squares method as the transition pattern of the received signal strength.

22. The vertical handoff method of claim 16, wherein (b) comprises using a linear square line derived by using a least squares method as the transition pattern of the received signal strength.

23. A vertical handoff method of a mobile station that can access a first network having relatively wide service coverage and a second network having relatively narrow service coverage in an area where service coverages of heterogeneous networks are overlapped, the vertical handoff method comprising:
 (a) determining a serving network of the mobile station;
 (b) when the serving network is the first network, deciding whether or not to perform first vertical handoff by using a prediction result of a transition pattern of a received signal strength (RSS) received from the second network when the received signal strength is greater than a first threshold value; and
 (c) when the serving network is the second network, deciding whether or not to perform second vertical handoff by using the prediction result of the transition pattern of the received signal strength received from the second network when the received signal strength is less than a second threshold value,
 wherein the first threshold value is greater than the second threshold value, and wherein the transition pattern is calculated using the formula $$\begin{cases} \sigma = \dfrac{\sum_{i=1}^{n} s_i \sum_{i=1}^{n} t_i^2 - \sum_{i=1}^{n} t_i \sum_{i=1}^{n} t_i s_i}{n \sum_{i=1}^{n} t_i^2 - \left(\sum_{i=1}^{n} t\right)^2} \\ \theta = \dfrac{n \sum_{i=1}^{n} t_i s_i - \sum_{i=1}^{n} t_i \sum_{i=1}^{n} s_i}{n \sum_{i=1}^{n} t_i^2 - \left(\sum_{i=1}^{n} t\right)^2} \end{cases}$$

where n denotes a total number of received signal strength detections for an accurate vertical handoff decision, and is based on an experimental result, $t_i$ denotes a predetermined time (i.e., X-axis) taken until termination of the detection of the received signal strength for the vertical handoff decision, Si denotes a received signal strength of a least squares line S, and corresponds to the Y-axis, $\sigma$ denotes a crossing region of the least squares line S and the Y-axis, and $\theta$ denotes a slope of the least squares line S.

* * * * *